US006957845B2

United States Patent
Rager

(10) Patent No.: US 6,957,845 B2
(45) Date of Patent: Oct. 25, 2005

(54) SPACE FRAME CROSS MEMBER WITH INTEGRATED DOOR SEAL FEATURE

(75) Inventor: Christopher A. Rager, Womelsdorf, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/630,933

(22) Filed: Jul. 31, 2003

(65) Prior Publication Data

US 2005/0023865 A1 Feb. 3, 2005

(51) Int. Cl.⁷ ................................................ B60J 10/08
(52) U.S. Cl. ............................ 296/146.9; 296/193.06; 296/205; 296/29; 296/210
(58) Field of Search .................. 296/193.06, 193.05, 296/203.01, 205, 209, 29, 146.9, 210, 203.03

(56) References Cited

U.S. PATENT DOCUMENTS

| | | | |
|---|---|---|---|
| 4,552,400 A | 11/1985 | Harasaki et al. | |
| 5,382,071 A | 1/1995 | Enning et al. | |
| 6,322,135 B1 * | 11/2001 | Okana et al. | 296/203.03 |
| 2001/0002760 A1 | 6/2001 | Gabbianelli et al. | |

FOREIGN PATENT DOCUMENTS

| | | |
|---|---|---|
| JP | A-58-185376 | 10/1983 |
| JP | A-60-12333 | 1/1985 |
| JP | A-2-249771 | 10/1990 |
| JP | A-6-263062 | 9/1994 |
| JP | A-10-278841 A | 10/1998 |

* cited by examiner

Primary Examiner—Jason Morrow
(74) Attorney, Agent, or Firm—Berenato, White & Stavish

(57) ABSTRACT

A vehicle frame assembly comprises a hydroformed vertical member (e.g., b-pillar), a hydroformed longitudinal member (e.g., roof rail), and a cross member with a transition flange wrapping above or below the longitudinal member. The transition flange provides rounded corners to enhance the door seal feature. In the preferred embodiment, the transition flange may be integrally formed as part of a stamped cross member or may be a separately formed transition bracket member attached to the cross member.

17 Claims, 4 Drawing Sheets

SPACE FRAME CROSS MEMBER WITH INTEGRATED DOOR SEAL FEATURE

FIELD OF THE INVENTION

The present invention is generally related to motor vehicle space frames and more particularly to a door seal interface structure for providing a door seal-engagable surface between a pair of space frame members in the vicinity of a joint therebetween.

BACKGROUND OF THE INVENTION

Space frame architecture is increasingly being used in vehicle construction. Space frames are cage-like structures constructed of a plurality of elongated structural components connected together at joints. The vehicle is assembled by mounting other vehicle components, such as vehicle body panels, on the space frame.

Vehicle doors are usually mounted on each side of the vehicle for pivotal movement between open and closed positions with respect to a door opening. Each door of a contemporary vehicle has a continuous peripheral door seal typically constructed of a resilient rubber-like material that sealingly engages a corresponding surface or surfaces surrounding the associated door opening when the door is closed. The door seal acts as a barrier which seals the vehicle passenger compartment when the door is closed, thereby protecting the vehicle occupants and the vehicle interior from outside weather conditions, noise, pollution and so on.

Vehicle space frames are often provided with several longitudinally spaced pairs of corresponding laterally spaced, essentially vertically extending pillar structures. These include a forward-most pair of pillar structures (constituting the "A" pillars), one or more pairs of intermediate pillar structures (e.g., the "B" pillars) and a pair of rearward-most pillar structures (e.g., the "C" or "D" pillars). The vehicle door may be pivotally mounted on a pillar structure by a pair of hinges for movement between open and closed positions. In the closed position, each door may be received between adjacent pillar structures on one side of the space frame.

Space frames can advantageously be constructed using tubular hydroformed components. A space frame can be constructed such that the pairs of pillar structures and the side rails are hydroformed. An advantage of using hydroforming technology to construct a space frame is that it can provide greater dimensional accuracy. To help achieve this benefit, it is advantageous to form as few connections as possible, and to connect hydroformed members directly to one another with no intervening connecting member. In general, the fewer connections made, the less the amount of tolerance variation build-up.

In the instance in which it may be desirable to mount the vehicle door directly to a hydroformed pillar, as in the above-incorporated application, the pillar and the adjoining hydroformed side rail may be used to directly engage a portion of the resilient seal formed around the periphery of the door. In the vicinity of the joint between directly connected hydroformed rail and pillar portions, however, a relatively sharp angular relation exists (e.g., orthogonal) between the parts and, therefore, does not provide suitable transition surface (e.g., an arcuate transition surface) to accommodate a door seal. Similar door seal issues exist toward the top coeners of the door opening, at which the pillars are connected to an upper longitudinal rail. There is a need for a space frame that takes advantage of the benefits of hydroforming while providing a transition surface between the door seal engaging surface of each pillar and the door seal engaging surface of the adjoining rail.

The door seal feature on typical unibody structures encircle the door opening and often have rounded corners at the joints between the longitudinal rails and vertical members; e.g., roof rail to b-pillar joint. The rounded corners provide a smooth transition from the vertical member to the longitudinal member. On a hydroformed spaceframe, the door seal feature can be incorporated into the hydroformed members; however, the smooth/rounded transitions at the joints can be very difficult to form.

The need exists for rounded corners of the door seal feature to define a smooth transition section thereby eliminating difficult features in the hydroformed members.

SUMMARY OF THE INVENTION

To meet the need identified above, the present invention provides a door seal interface structure for a motor vehicle space frame, the door seal interface structure comprising a longitudinally extending hydroformed tubular rail portion, a hydroformed tubular pillar portion and a roof cross member with transition structure connected at a joint to the rail and pillar portions. The rail portion and the pillar portion provide respective surfaces that sealingly engage a door seal to seal a closed vehicle door. The transition structure of the roof cross member is formed with a door seal feature that provides the rounded corners at the joint between the rail portion and the pillar portion.

In the preferred embodiment, the door seal feature defines a transition structure in the vicinity of the joint to provide a transition between the rail portion and pillar portion surfaces. The transition surface portion sealingly engages a portion of the door seal to seal the closed vehicle door and thereby provides a door seal-engagable surface in the vicinity of the joint.

The specific structure and arrangement of the roof cross member and transition structure may take several forms. In the preferred embodiment, the roof cross member is a stamped cross member with an integrally-formed transition structure. Alternatively, the transition structure may be a stamped bracket member that is separately attached (e.g., welding, bolts, etc.) to a cross member whereby the bracket member would be attached at the joint between the pillar and roof rail to provide the door seal feature.

Other aspects, features, and advantages of the present invention will become apparent from the following detailed description, the accompanying drawings, and the appended claims.

DETAILED DESCRIPTION OF PREFERRED EMBODIMENTS

Figure 1:
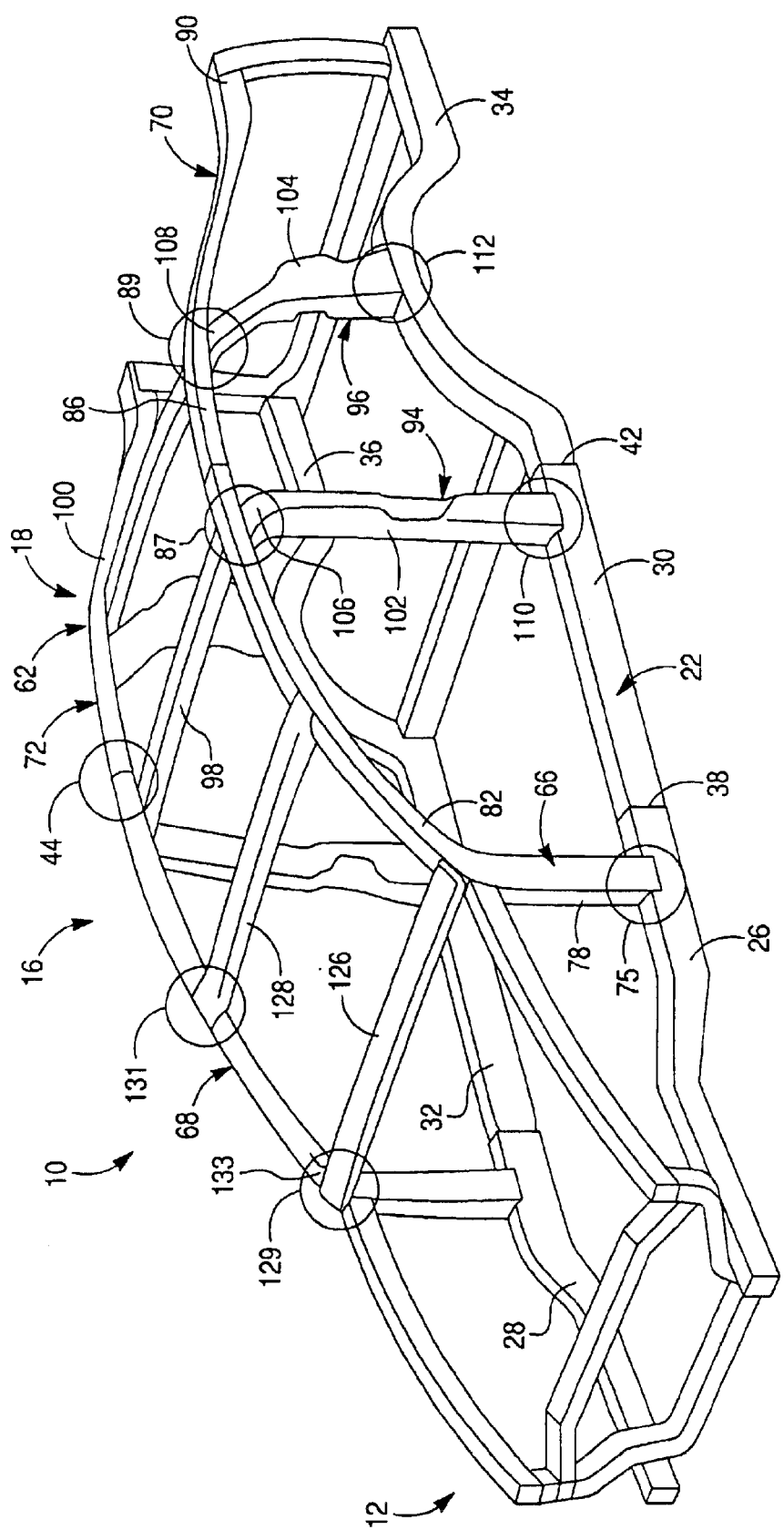
FIG. 1 is a perspective view of a conventional vehicle space frame.

FIG. 1 is a perspective view of a conventional vehicle space frame 10. The space frame 10 generally includes a forward frame portion 12, a middle frame portion 16 and a rearward frame portion 18. A pair of laterally spaced, longitudinally extending lower side rail structures 22 are disposed on each side of the space frame 10 and extend the length thereof.

The lower side rail structures 22 are preferably constructed of three tubular hydroformed members fixed together at joints. Specifically, each side rail structure 22 includes a hydroformed forward lower side rail member 26, 28, respectively, a hydroformed intermediate lower side rail member 30, 32, respectively, and a hydroformed rearward lower side rail member 34, 36, respectively. The pairs of hydroformed members 26, 28; 30, 32; and 34, 36 are of mirror image construction. Only one member 26, 30, and 34 of each pair will be discussed in detail, but the discussion applies to both pair members.

Each forward lower side rail member 26 is connected to the associated intermediate lower side rail member 30 at a joint 38. Similarly, each intermediate lower side rail member 30 is connected to the associated rear lower side rail member 34 at a joint 42.

A forward end portion of the intermediate lower side rail member 30 is constructed and arranged to be telescopically received within a rearward end portion of the forward lower side rail member 26 and is welded in place to form the joint 38. Joint 42 is of similar construction. That is, a forward end portion of the rearward lower side rail member 34 is constructed and arranged to be telescopically received within a rearward end portion of the intermediate lower side rail member 30 and is welded in place to form the joint 42.

An upper longitudinal structure 62 is mounted on each side of the space frame 10. Each upper longitudinal structure 62 is formed from a pair of tubular hydroformed members. Specifically, each upper longitudinal structure 62 includes a tubular hydroformed forward upper longitudinal member 66, 68, respectively, and a hydroformed tubular rearward upper longitudinal member 70, 72, respectively. The pairs of forward and rearward upper longitudinal members 66, 70 and 68, 72 on each side of the space frame 10 are connected at joints 44. Preferably the joint 44 is formed by placing a forward tubular end of the rearward upper longitudinal member 70 telescopically within a rearward end of the forward upper longitudinal member 68 and welding the pair of members 68, 70 together.

The members 66, 68 and 70, 72 are of mirror image construction. Therefore the following description will focus on members 66 and 70, but applies equally to members 68 and 72. Each forward upper longitudinal member 66 is an integral hydroformed tubular member that includes an essentially straight pillar-forming portion 78 and an arcuate longitudinally extending portion 82. Each pillar-forming portion 78 is connected to a respective forward lower side rail member 26 at a joint 75 and extends upwardly therefrom so that the pillar-forming portion 78 of each forms a forward-most or "A" pillar structure of the space frame 10.

Each rearward upper longitudinal member 70 has an arcuate forward longitudinally extending portion 86 which transitions into a short end portion 90. As considered below, the longitudinally extending portions 82 of the forward upper longitudinal member 66 form joints 87 with a tubular hydroformed first U-shaped cross member 94 of the space frame 10; and the longitudinally extending portions 86 form joints 89 with a tubular hydroformed second U-shaped cross member 96. Each pair of longitudinally extending portions 82 and 86 on each side of the space frame 10 defines a roof rail structure between the associated A pillar-forming portion 78 of the forward upper longitudinal member 66 and the joints 89 with a cross member 96 on respective sides of the space frame 10.

The first U-shaped cross member 94 and the second U-shaped cross member 96 extend laterally across the space frame 10. Each cross member 94, 96 is typically an integral tubular hydroformed member that includes a cross portion 98, 100, respectively, and a pair of integral leg portions 102, 104, respectively, extending from junctures 106, 108 at opposite ends of the associated cross portion 98, 100. The leg portions 102, 104 of the first and second U-shaped members 94, 96 form joints 110, 112, respectively, with the lower side rail members 30, 34, respectively.

The leg portions 102 of the U-shaped member 94 are essentially straight and extend upwardly from respective side rail structures 22 to form a pair of laterally spaced intermediate or "B" pillar structures on the space frame 10 that extend between the associated lower side rail structure 22 and the associated roof rail structure.

Similarly, the leg portions 104 of the second U-shaped member 96 form a pair of rearward-most or "C" pillar structures on the space frame 10 that extend between the associated lower side rail structure 22 and the associated roof rail structure. The cross portions 98, 100 of the first and second U-shaped members 94, 96 provide laterally extending cross structures that extend in the cross-car direction between the pair of B pillar structures and between the pair of C pillar structures, respectively, and define a lateral length between the associated pairs through the use of an integral hydroformed structure, thereby minimizing the stacked tolerances between the pairs of B and C pillars.

A pair of laterally extending tubular hydroformed cross members 126, 128 provide space frame cross structures interconnecting the forward upper longitudinal members 66, 68 and provide support structures for a vehicle windshield (not shown) in the assembled vehicle. The cross member 126 is connected to the upper longitudinal members 66, 68 at joints 129. Each end of the cross member 126 is welded in a hydroformed recess 133 formed within the forward upper longitudinal member 66, 68 during the hydroforming process. The joints 129 are formed on the longitudinally extending portion 82 of each member 66, 68 above the transition between the pillar-forming portion 78 and the longitudinally extending portion 82 of each forward upper longitudinal member 66, 68. The tubular cross member 128 has flattened ends that are placed in overlying, abutting relation with the longitudinally extending portions 82 of the forward upper longitudinal members 66, 68 and welded in place to form joints 131.

The conventional arrangement of FIG. 1 suffers from drawbacks because the door seal feature on a typical unibody structure encircle the door opening and often have rounded corners at the joints between the longitudinal rails and vertical members; e.g., joint at roof rail 82 and b-pillar 102. Rounded corners are necessary to provide a smooth transition from the vertical member 102 to the longitudinal member 82. On the hydroformed spaceframe according to FIG. 1, the door seal feature can be incorporated into the hydroformed members 102, 82, 98; however, the smooth/rounded transitions at the joints can be very difficult to form.

Figure 2:
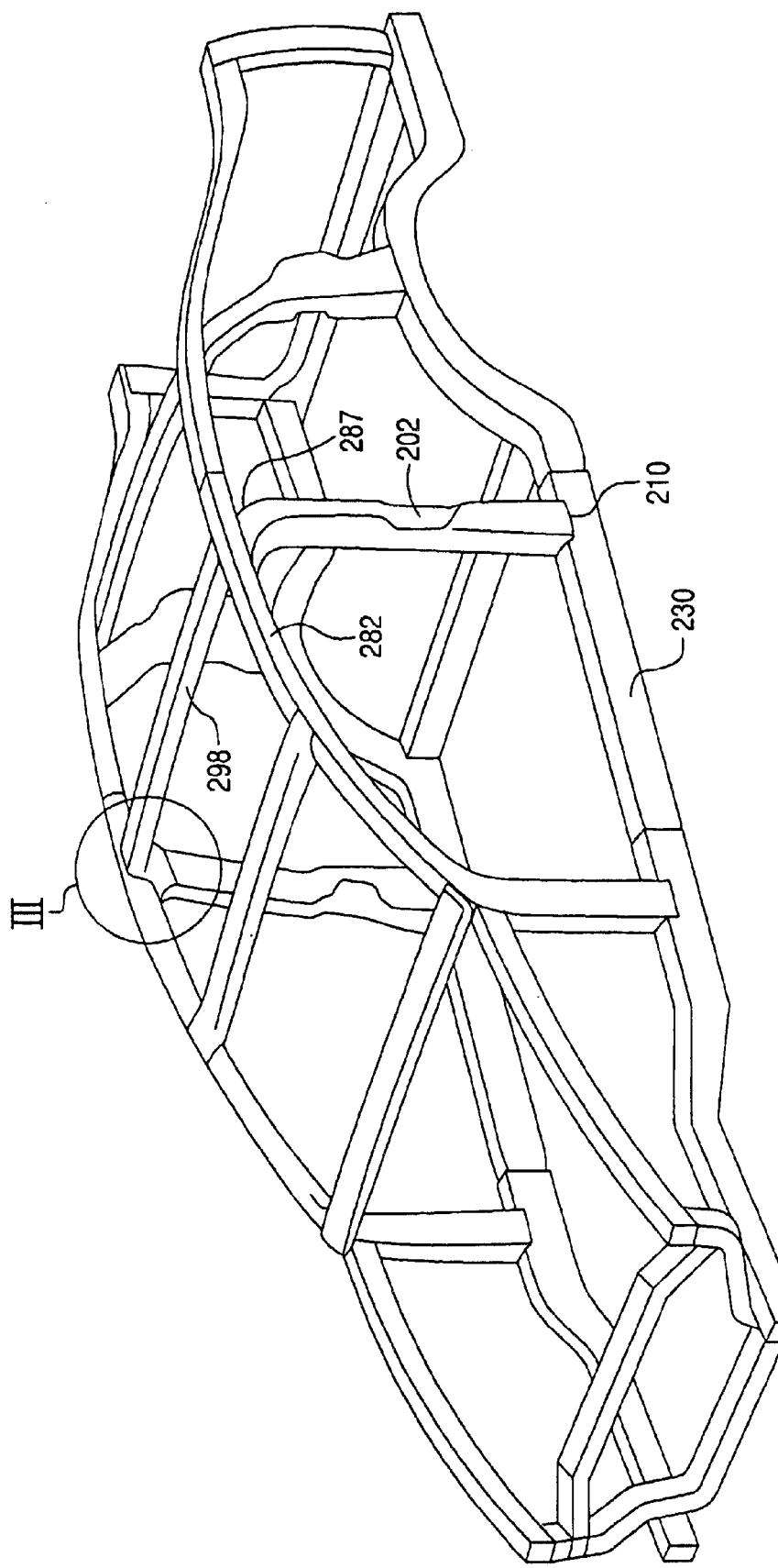
FIG. 2 is a perspective view of a vehicle space frame incorporating the interface structure according to this invention.

With reference to FIG. 2, the instant invention provides rounder corners for the door seal feature to define a smooth transition section thereby eliminating difficult features in the hydroformed members.

More specifically, the B-pillar 202 is not formed as a U-shaped member as shown in FIG. 1. Instead, the B-pillar 202 is a vertical leg portion that extends from the lower side rail member 230 to the longitudinally extending roof rail portion 282. The B-pillar 202 is typically an integral tubular hydroformed member that forms a joint 210 with the lower side rail members 230 and a joint 287 with the roof rail portion 282.

The roof cross member 298 provides a laterally extending cross structure that extend in the cross-car direction between the pair of B pillar structures and define a lateral length through the use of an integral stamped or hydroformed structure, thereby minimizing the stacked tolerances between the pairs of B-pillars.

Figure 3:
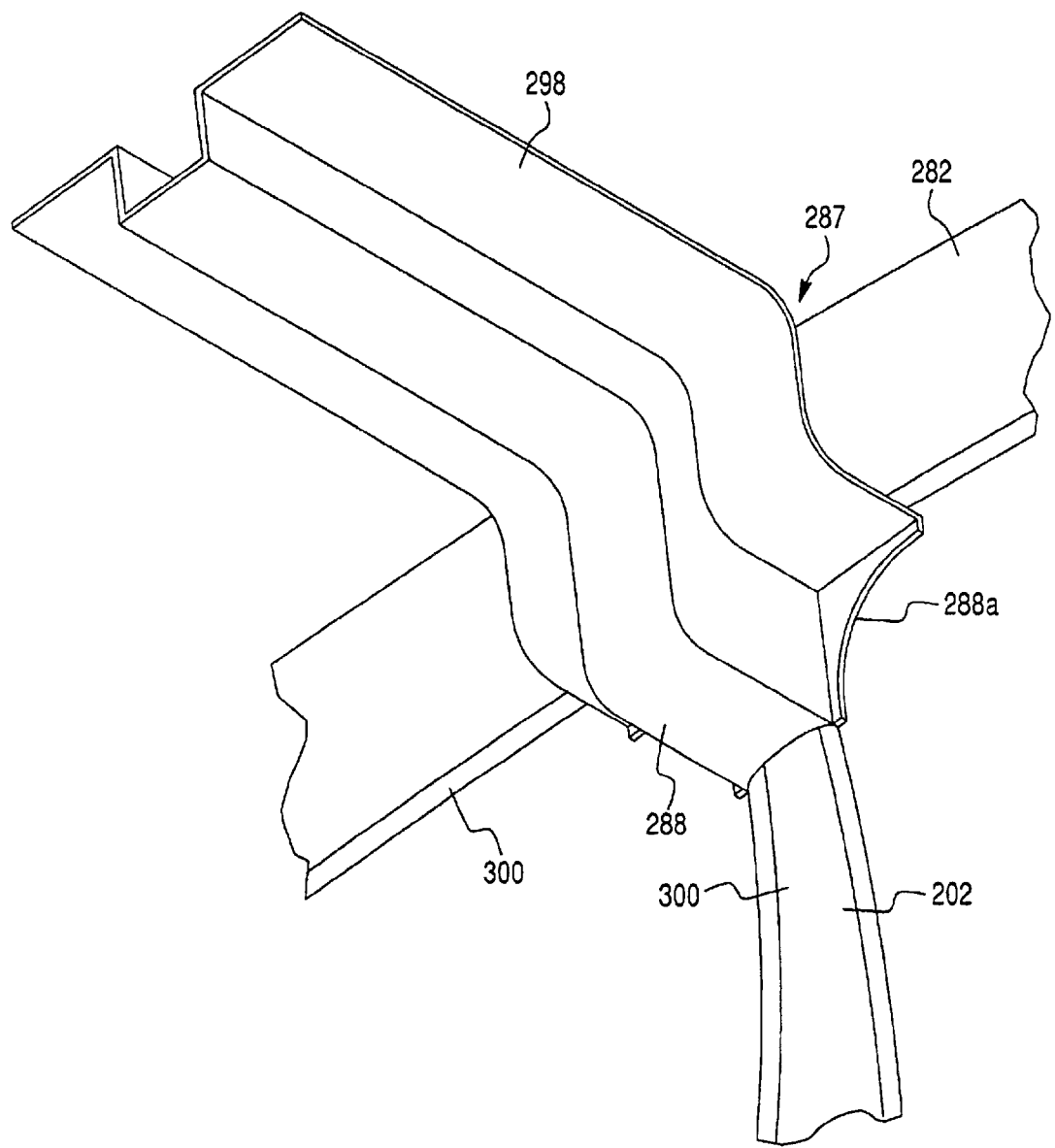
FIG. 3 is a partial perspective view showing the interface structure of a longitudinally extending hydroformed rail portion, a hydroformed pillar portion and a roof cross member as illustrated in FIG. 2.
Figure 4:
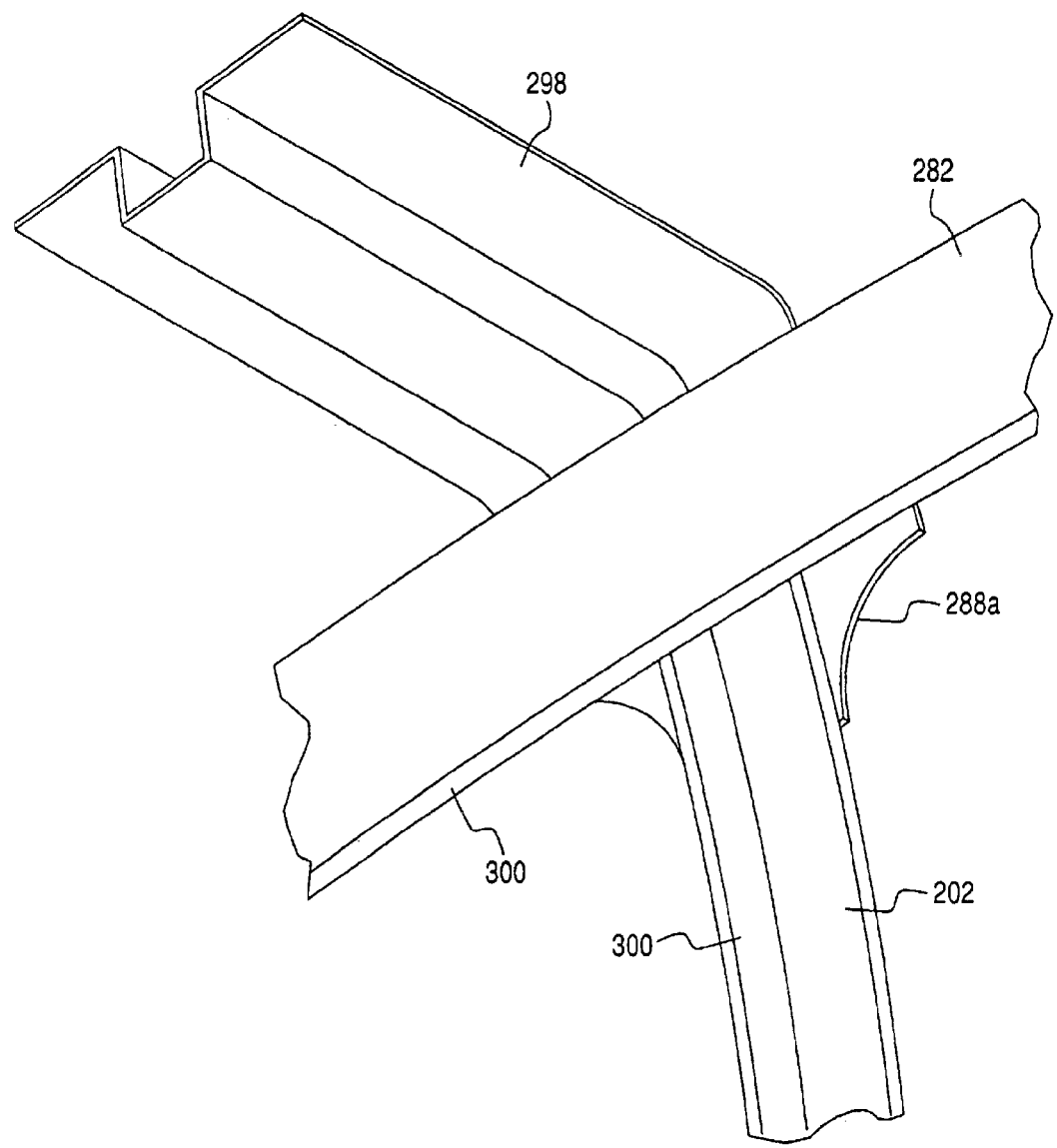
FIG. 4 is a partial perspective view showing the interface structure of a longitudinally extending hydroformed rail portion, a hydroformed pillar portion and a roof cross member as illustrated in FIG. 2 with the transition flange wrapping around the top of the roof rail.

With reference to FIG. 3, a door seal interface structure for a motor vehicle space frame is illustrated. The door seal interface structure comprises a longitudinally extending hydroformed roof rail portion 282, a hydroformed B-pillar portion 202 and a roof cross member 298 connected at an intersection or joint 287 to the rail and pillar portions 282, 202. The roof rail portion 282 and the B-pillar portion 202 provide respective surfaces or seal landings 300 that sealingly engage a door seal to seal a closed vehicle door (not shown). The roof cross member 298 is formed with a transition flange 288 that provides the rounded corners 288a at the joint between the roof rail portion 282 and the B-pillar portion 202. The transition flange 288 defines a transition structure in the vicinity of the joint. The transition structure provides a transition surface that provides a transition between the rail portion and pillar portion surfaces. The transition surface portion; i.e., rounded corners 288a, sealingly engages a portion of the door seal to seal the closed vehicle door and thereby provides a door seal-engagable surface in the vicinity of the joint. The specific shape and layout of the transition structure will vary depending on the shape and configuration of the roof rail and pillar as well as the shape of the intersection or junction 287. FIG. 4 shows an alternate embodiment where the transition flange wraps around the to side of the roof rail.

With conventional space frame designs, the door seal feature encircles the door opening and often have rounded corners at the joints between the longitudinal rails and vertical members; e.g., roof rail to b-pillar joint. The rounded corners provide a smooth transition from the vertical member to the longitudinal member. On a hydroformed spaceframe, the door seal feature can be incorporated into the hydroformed members; however, the smooth/rounded transitions at the joints can be very difficult to form.

As described above, the present invention provides a roof cross member formed with a smooth transition section that wraps at least partly around the B-pillar portion and roof rail portion to define rounded corners to receive and enhance a door seal feature of a vehicle frame assembly, thereby eliminating difficult features in the hydroformed members.

With the foregoing invention has been shown and described with reference to a preferred embodiment, it will be understood by those of skill in the art that various changes in form and detail may be made therein without departing from the spirit and scope of this invention. For example, the specific structure and arrangement of the roof cross member and transition structure may take several forms. In the preferred embodiment, the roof cross member is a stamped cross member with an integrally-formed transition structure. Alternatively, the transition structure may be a stamped bracket member that is separately attached (e.g., welding, bolts, etc.) to a cross member whereby the bracket member would be attached at the joint between the pillar and roof rail to provide the door seal feature. The shape of the transition structure may vary depending on the shape and layout of the roof rail and pillar intersection.

What is claimed is:

1. A vehicle frame assembly comprising:
   a first vertical pillar member,
   a first longitudinal roof rail member, said roof rail member and said pillar member meet to form an intersection, and
   a cross member including a transition flange providing rounded corners at said intersection to receive and enhance a door seal feature of a vehicle frame assembly,
   wherein said transition flange extends through a continuous surface from said cross member across one of a top side and a bottom side of said roof rail member to said pillar member, and
   wherein said transition flange is integrally and homogeneously formed with said cross member as a unitary body.

2. The vehicle frame assembly according to claim 1, wherein said transition flange is a stamped cross member bracket.

3. The vehicle frame assembly according to claim 1, wherein said transition flange wraps at least partly around the longitudinal roof rail member.

4. The vehicle frame assembly according to claim 1, wherein said cross member is formed by stamping.

5. The vehicle frame assembly according to claim 1, wherein said cross member is formed by a hydroforming process.

6. The vehicle frame assembly according to claim 1, wherein said transition flange at least partly overlies said first pillar member and said first roof rail member.

7. A vehicle frame assembly comprising:
   a first vertical pillar member,
   a first longitudinal roof rail member, said roof rail member and said pillar member meet to form an intersection, and
   a cross member including a transition flange providing rounded corners at said intersection to receive and enhance a door seal feature of a vehicle frame assembly,
   wherein said transition flange extends through a continuous surface from said cross member across one of a top side and a bottom side of said roof rail member to said pillar member, and
   wherein said transition flange wraps above said top side of said roof rail member.

8. The vehicle frame assembly according to claim 7, wherein said transition flange wraps below said bottom side of said roof rail member.

9. The vehicle frame assembly according to claim 7, wherein said transition flange extends in front of said pillar member.

10. The vehicle frame assembly according to claim 7, wherein said transition flange extends behind said pillar member.

11. The vehicle frame assembly according to claim 7, wherein said transition flange provides a relatively flat surface blending into the door seal feature thus creating a smooth transition between the first pillar member and the first roof rail member.

12. The vehicle frame assembly according to claim 7, wherein said cross member extends between said first pillar member and a second pillar member.

13. The vehicle frame assembly according to claim 7, wherein said cross member extends between said first roof rail member and a second roof rail member.

14. The vehicle frame assembly according to claim 1, wherein said transition flange wraps below said bottom side of said roof rail member.

15. The vehicle frame assembly according to claim 1, wherein said transition flange extends in front of said pillar member.

16. The vehicle assembly according to claim 1, wherein said transition flange extends behind said pillar member.

17. The vehicle frame assembly according to claim 1, wherein said transition flange provides a relatively flat surface blending into the door seal feature thus creating a smooth transition between the first pillar member and the first roof rail member.

* * * * *